US007305421B2

(12) United States Patent
Cha et al.

(10) Patent No.: US 7,305,421 B2
(45) Date of Patent: Dec. 4, 2007

(54) PARALLELIZED REDO-ONLY LOGGING AND RECOVERY FOR HIGHLY AVAILABLE MAIN MEMORY DATABASE SYSTEMS

(75) Inventors: Sang K. Cha, Seoul (KR); Juchang Lee, Seoul (KR); Kihong Kim, Seoul (KR)

(73) Assignee: SAP AG, Walldorf (DE)

( * ) Notice: Subject to any disclaimer, the term of this patent is extended or adjusted under 35 U.S.C. 154(b) by 73 days.

(21) Appl. No.: 10/195,822

(22) Filed: Jul. 15, 2002

(65) Prior Publication Data

US 2003/0061537 A1 Mar. 27, 2003

Related U.S. Application Data

(60) Provisional application No. 60/305,956, filed on Jul. 16, 2001, provisional application No. 60/305,937, filed on Jul. 16, 2001.

(51) Int. Cl.
*G06F 17/30* (2006.01)

(52) U.S. Cl. ............................ 707/202; 707/10; 707/3

(58) Field of Classification Search ................ 707/200, 707/202, 8, 10, 3; 714/15
See application file for complete search history.

(56) References Cited

U.S. PATENT DOCUMENTS 5,455,946 A * 10/1995 Mohan et al. .............. 707/202
5,499,367 A * 3/1996 Bamford et al. ............... 707/8
5,870,763 A * 2/1999 Lomet ........................ 707/202
5,933,838 A * 8/1999 Lomet ........................ 707/202
5,946,698 A * 8/1999 Lomet ........................ 707/202
6,067,550 A * 5/2000 Lomet ........................ 707/202
6,151,607 A * 11/2000 Lomet ........................ 707/202
6,182,086 B1 * 1/2001 Lomet et al. .............. 707/202
6,490,594 B1 * 12/2002 Lomet ........................ 707/200
6,567,928 B1 * 5/2003 Lyle et al. .................... 714/15
6,678,704 B1 * 1/2004 Bridge et al. ............... 707/202
6,763,436 B2 * 7/2004 Gabber et al. ............. 711/146
6,868,067 B2 * 3/2005 Rostron ...................... 370/241
7,028,217 B2 * 4/2006 Franckowiak et al. ........ 714/11
7,061,923 B2 * 6/2006 Dugan et al. ............... 370/396

* cited by examiner

*Primary Examiner*—Jean M. Corrielus
(74) *Attorney, Agent, or Firm*—Schwegman, Lundberg & Woessner, P.A.

(57) ABSTRACT

A parallel logging and recovery scheme for highly available main-memory database systems is presented. A preferred embodiment called parallel redo-only logging ("PROL") combines physical logging and selective replay of redo-only log records. During physical logging, log records are generated with an update sequence number representing the sequence of database update. The log records are replayed selectively during recovery based on the update sequence number. Since the order of replaying log records doesn't matter in physical logging, PROL makes parallel operations possible. Since the physical logging does not depend on the state of the object to which the log records are applied, the present invention also makes it easy to construct a log-based hot standby system.

56 Claims, 12 Drawing Sheets

PARALLELIZED REDO-ONLY LOGGING AND RECOVERY FOR HIGHLY AVAILABLE MAIN MEMORY DATABASE SYSTEMS

RELATED APPLICATION

This application claims the benefit of now abandoned U.S. Provisional Application Ser. No. 60/305,956, filed Jul. 16, 2001, entitled "Parallel Logging and Restart Method and System Based on Physical Logging in Main-Memory Transaction Processing System," and now abandoned U.S. Provisional Application Ser. No. 60/305,937, filed Jul. 16, 2001, entitled "Parallel Logging and Restart Method and System Based on Physical Logging in Disk-Based Transaction Processing System.

BACKGROUND OF THE INVENTION

1. Technical Field

This invention in general relates to database systems and methods. More specifically, the present invention relates to parallelized redo-only logging and recovery for highly available main-memory database systems.

2. Description of Related Art

A main-memory database management system (MM-DBMS) keeps a database in main memory to take advantage of the continuously improving the price/density ratio of available memory chips. This memory-centered database architecture simplifies the DBMS and enables the MM-DBMS to better exploit the hardware computing power, such as high-speed L2 cache memory, than a disk-resident DBMS (DR-DBMS) where the database is kept in the disk. For database designers and application developers, the simplicity of a DBMS translates to the ease of optimizing the performance of the overall database systems and their applications.

While the benefit of the MM-DBMS has well been perceived for read-oriented transactions, the MM-DBMS can also achieve a higher performance than the DR-DBMS in update transactions because updates in the MM-DBMS incur only sequential disk accesses for appending the update logs to the end of the log file and occasionally checkpointing the updated database pages to the backup copy resident in the disk.

Logging is essential for MM-DBMS to recover a consistent database state in case of a system failure. The recovery involves first loading the backup database in memory and then replaying the log in the serialization order. Checkpointing helps throw away the old portion of the log file and thus shorten the log replay time. Between these two types of run-time disk accesses, the logging performance is more critical than the recovery performance. If an MM-DBMS relies on a single log device in favor of the simplicity of enforcing the serialization order during log replay, its update throughput during logging is bound by the contention on a single log buffer and the I/O bandwidth of the log device.

To address the problem of this bottleneck, multiple log disks for parallel logging has been used. However, a naïve parallel logging scheme pays the cost of merging log records distributed over multiple log disks in the serialization order during recovery. To overcome this problem, Lee et al proposed the so-called differential logging that exploits a full degree of parallelism both in logging and recovery. See Juchang Lee, Kihong Kim, and Sang K. Cha, "Differential Logging: A Commutative and Associative Logging Scheme for Highly Parallel Main Memory Database," Proceedings of ICDE Conference, pp. 173-182, 2001.

The differential logging scheme uses a bit-wise XOR operation, both associative and commutative, for a redo operation as well as an undo operation so that the log records, each of which contains the bit-wise XOR difference between the after and before images, can be replayed in a manner independent of their serialization order during recovery. Such order independence enables distribution of log records to an arbitrary number of log disks, leading to almost linear scale-up of the update throughput during logging until it is bound by either the CPU power or the I/O bandwidth.

Not only the logging time, but also the recovery time can also be scaled down proportionally by replaying the log records in each log disk independently in a single pass. Even the process of loading the backup database partitioned over multiple disks may proceed in parallel along with the process of replaying the logs once the main memory database is initialized with zeros. In addition to the benefit of parallel execution, the differential logging scheme also reduces the log volume to almost half compared to the conventional redo/undo logging.

Similarly, in the area of non-differential logging, there is also a need for an efficient logging scheme that can exploit massive parallelism.

OBJECTS AND SUMMARY OF THE INVENTION

It is an object of the present invention to provide an efficient logging and recovery scheme based on non-differential logging that can be used to recover a consistent transaction processing system after a failure occurs.

It is another object of the present invention to provide a logging and recovery scheme where massively parallel operations are possible.

The above-mentioned and other objects are achieved by the present invention that uses physical logging and selective replaying of log records based on an update sequence number for representing the sequence of updates to the database. The update sequence number may be a global sequence number (GSN) representing the sequence of updates to the entire database, a transaction sequence number (TSN) representing the sequence of transactions logged, or a slot sequence number (SSN) for representing the sequence of updates to a particular slot of the database. A preferred embodiment is called "parallel redo-only logging (PROL)" combining physical logging and selective replay of log records using private buffering.

Since the order of replaying log records doesn't matter in physical logging, parallel operations for recovery are possible. Since the physical logging does not depend on the state of the object to which the log records are applied, the present invention makes it easy to construct a log-based hot standby system. The performance evaluation of the present invention on a 4-way multiprocessor system shows that the PROL scheme outperforms the non-parallelized redo-only logging scheme.

DETAILED DESCRIPTION OF THE INVENTION

A. Architecture of Highly Parallel and Available MM DBMS

Highly Parallel Logging

Figure 1:
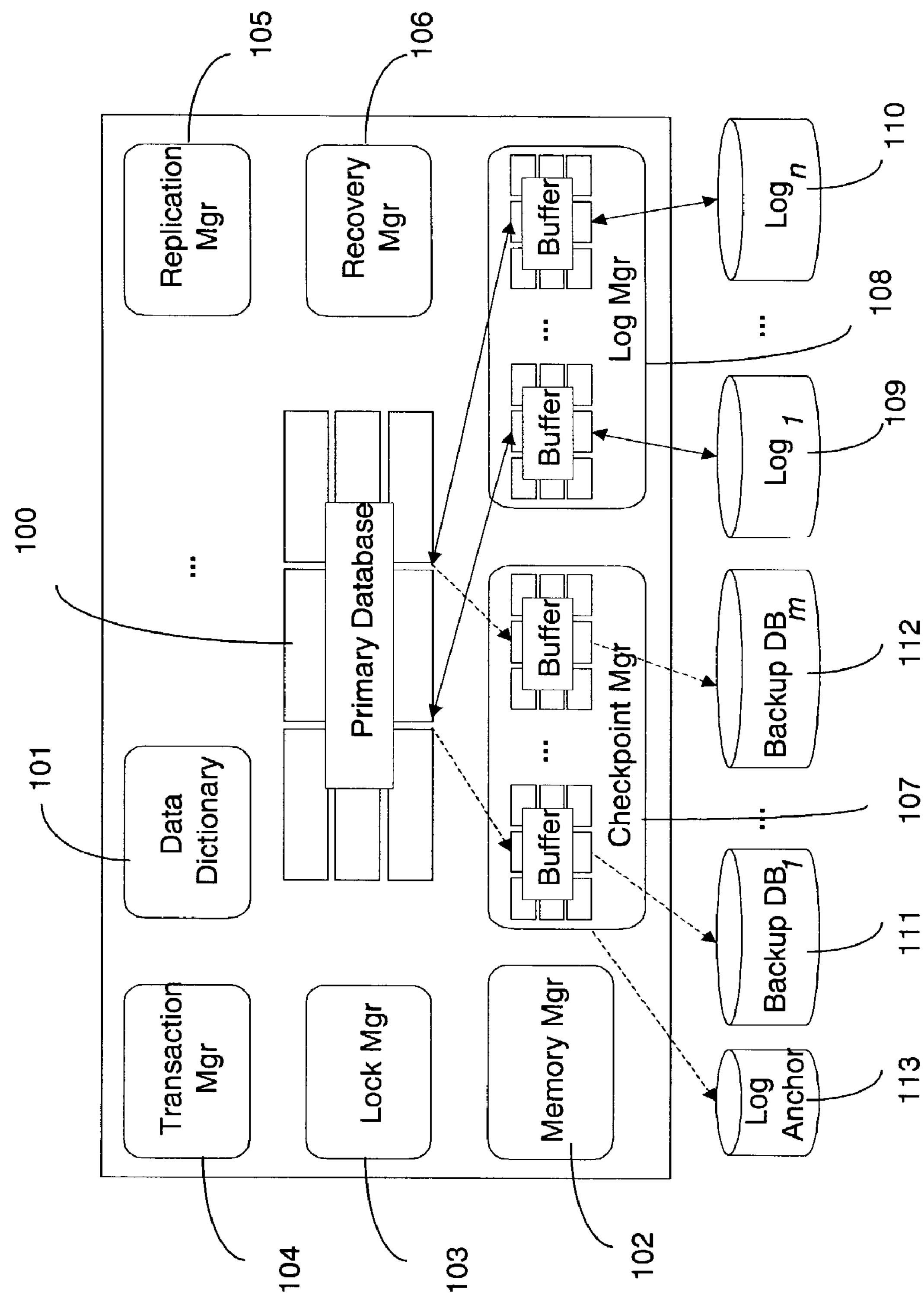
FIG. 1 is a block diagram of the architecture of a highly parallel and available MM-DBMS of the present invention.

FIG. 1 shows the architecture of a highly parallel and available MM-DBMS of the present invention, where database functionalities are implemented with a primary database 100, a data dictionary 101 for storing metadata about the structure of the database, and a number of database managers, such as a memory manager 102 for managing allocation of space and data structures in main memory, a lock manager 103 for managing a locking table used for concurrency control among transactions executing concurrently, a transaction manager 104 for ensuring that the database remains in a consistent state despite a system failure, a replication manager 105 for managing a remote backup copy in case of environmental disasters, a recovery manager 106 for recovering a consistent database state in case of a system failure, a checkpoint manager 107, and a log manager 108.

The log manager 108 is responsible for logging updates to the database 100 by generating log records. Each log record contains the physical image of the updated portion of the database. Logging is done in parallel by distributing log records to multiple log disks such as 109 and 110. In the present invention, log records may be preferably partitioned into multiple disks by transaction IDs (TIDs).

The checkpoint manager 107 is responsible for checkpointing, the process of making backup copies of the entire database from time to time. In the present invention, checkpointing may be done in parallel by partitioning each backup copy into multiple backup disks such as 111 and 112. A preferred system may maintain two backup copies based on the ping-pong checkpointing scheme. The locations of backup databases and important log records such as ones recording the beginning and the end of checkpointing are kept in a log anchor 113. In case of a system failure, a consistent state of the primary database 100 is recovered from the log and the most recent backup database.

The primary database 100 preferably consists of a number of fixed-size segments, where a segment is the basic unit of memory allocation. A segment is divided into fixed-size pages, and a page is again divided into fixed-size slots. Although the size of a slot is fixed within a page, it may vary by pages. A record is basically stored in one slot while a variable-length record is handled by linking multiple fixed-size slots. The size of a slot is determined when formatting a page in order to allocate it to a table. When a page becomes free by deletion of a record, it is added to the global free page list. The preferred embodiment uses fine-granular, slot-level locking and logging.

Highly Parallel Recovery Operations

Figure 2:
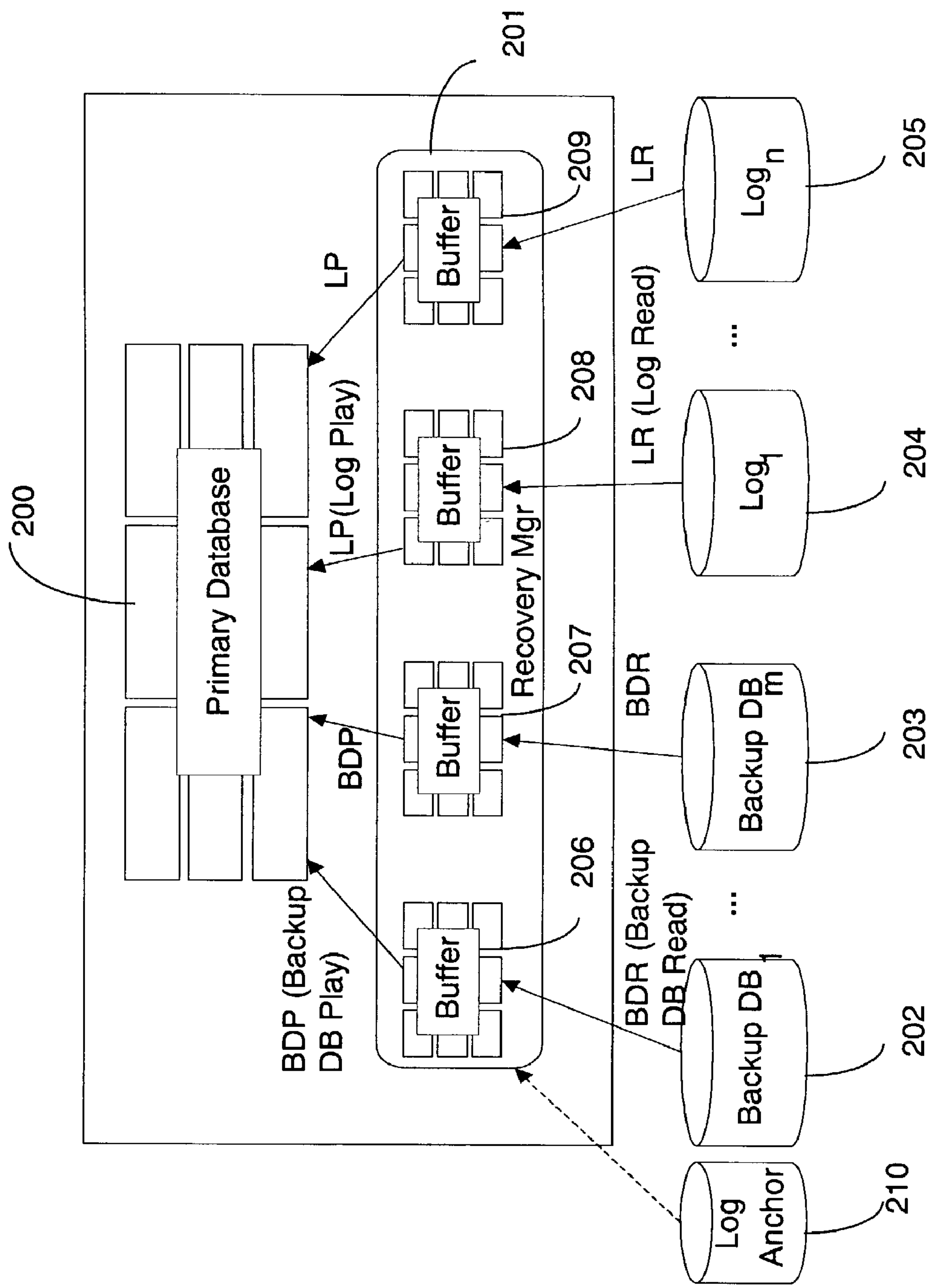
FIG. 2 is a block diagram of a highly parallel recovery scheme of the present invention.

FIG. 2 shows a highly parallel recovery scheme of the present invention where the recovery time can be scaled down proportionally as well by replaying the log records in each log disk independently in a single pass.

A primary database 200 is located in main memory is reconstructed in case of a system failure by reading and playing backup database stored in back disk such as 202 and 203 through buffers such as 206 and 207 in a recovery manager 201, and reading and playing log records stored in log disks such as 204 and 205 through buffers such as 208 and 209 in the recovery manager 201.

Since most of the conventional logging schemes require replaying log records by the serialization order, the achievable degree of parallelism during recovery is limited. Suppose that log records are distributed to multiple disks by transaction IDs (TIDs). Then, the log records stored in multiple disks should be merged in the serialization order before replaying. Or suppose that the database is partitioned and log records are distributed to log disks by that partitioning. This resource-partitioned parallel logging does not scale up well when updates are skewed to certain partitions or transactions span multiple partitions.

To overcome this limitation of conventional logging schemes, order-independent log replay has been explored by Lee et al based on differential logging. See Juchang Lee, Kihong Kim, and Sang K. Cha, "Differential Logging: A Commutative and Associative Logging Scheme for Highly Parallel Main Memory Database," Proceedings of ICDE Conference, pp. 173-182, 2001.

Order independence of log replaying enables the MM-DBMS to distribute log records without restriction to an arbitrary number of log disks, leading to an almost linear scale-up of the update throughput during logging until it is bound by either the CPU power or the IO bandwidth. The recovery time can be scaled down proportionally as well by replaying the log records in each log disk independently in a single pass. Even loading of the backup database, which may be partitioned over multiple disks for further parallelism, can proceed in parallel with replaying log records.

Theorem 1. (Order Independence of Commutative and Associative Log Replay)

Suppose that a redo operation ($O \rho L$) and an undo operation ($O \upsilon L$) are commutative and associative for a slot O and a log record L. Then, given the initial state $O_0$ of O and a set of log records $\{L_i | 1 \leqq i \leqq m\}$, the final state $O_m$ of O can be recovered from the initial state $O_0$ by redoing the log records in an arbitrary order, and the initial state $O_0$ can be recovered from the final state $O_m$ by undoing the log records in an arbitrary order.

Proof. The final state $O_m$ can be obtained by redoing the log records in their generation order, namely $O_m=O_0 \rho L_1 \rho L_2 \rho \ldots \rho L_m$. Suppose that the log records are redone in the order of $L_{k(1)}, L_{k(2)}, \ldots, L_{k(m)}$, where $k(i)\in\{1, 2, \ldots, m\}$ and k(i)!=k(j) for all i and j, i !=j. Then, $O_0 \rho L_{k(1)} \rho L_{k(2)} \rho \ldots \rho L_{k(m)}=O_0 \rho L_1 \rho L_2 \rho \ldots \rho L_m=O_m$.

Conversely, the initial state $O_0$ can be obtained by $O_0=O_m \upsilon L_m \upsilon L_{m-1} \upsilon \ldots \upsilon L_1$. Suppose that the log records are undone in the order of $L_{k(1)}, L_{k(2)}, \ldots, L_{k(m)}$, where $k(i)\in\{1, 2, \ldots, m\}$ and k(i) !=k(j) for all i and j, i !=j. Then, $O_0 \upsilon L_{k(1)} \upsilon L_{k(2)} \upsilon \ldots \upsilon L_{k(m)}=O_m \upsilon L_m \upsilon L_{m-1} \upsilon \ldots \upsilon L_1=O_0$. ■

As shown in Theorem 1, any logging scheme with commutative and associative redo and undo operations can replay log records in an arbitrary order. One such scheme is the so-called differential logging, which logs the bit-wise XOR difference between the after and the before images and replays log records by applying the same XOR operation.

The present invention presents alternative ways of implementing the associative and commutative redo and undo operations based on physical logging so that the order of replaying log records doesn't matter.

Log-based Management of Hot Standby

In a hot standby configuration, one server acting as a master server is being actively used to run a database, while another server acting as a slave server is in standby mode ready to take over if there is an operating system or hardware failure involving the first server. Typically, a message called "heartbeat" is passed between the two servers to monitor the working condition of each other server.

For high availability, the management of a hot standby system with the 1-safe scheme may be used, where a transaction can commit before successfully sending its log records to the slave server. In this scheme, the slave server continuously replays log records received from the master server. If no heartbeat message arrives from the master server for a given period, the slave server automatically takes over after aborting all the transactions alive. When the failed master server restarts, it first asks the latest reflected log record ID (identification) to the taken-over server. Then, it collects the transactions committed in the log located after that log record and sends all the collected log records to the taken-over server. Finally, it receives the log records generated during its down time from the taken-over master server and replays them. The preferred embodiment uses the 1-safe scheme for simplicity, but those skilled in the art would appreciate similar schemes can be used for other replication schemes.

B. Selective Log Replay

The present invention replays log records selectively to fully exploit the parallelism. The selective log replay is based on the observation that the consistent state of a slot can be recovered by replaying the latest log record for the slot when using physical logging. Replaying intermediate log records doesn't matter because the last log record replayed overrides all the log records replayed thus far for a given slot. To make selective log replaying possible, it is necessary to maintain an update sequence number or timestamp of a given slot to be that of the last log record replayed for that slot during the recovery time. Then, the log records whose update sequence number is smaller than the update sequence number of a slot may be safely discarded.

Definition 1. (Selective Redo and Undo Operations)

Suppose that sn(O) or sn(L) denotes the update sequence number of a slot O or a log record L. Then, the selective redo operation (O ρ L) and selective undo operation (O μ L) for a slot O and a log record L are defined by $$O\rho L=\begin{cases} L, \text{ if } sn(O)<sn(L) \\ O, \text{ otherwise}\end{cases} \text{ and } sn(O\rho L)=\begin{cases} sn(L), \text{ if } sn(O)<sn(L) \\ sn(O), \text{ otherwise}\end{cases}$$

$$O\mu L=\begin{cases} L, \text{ if } sn(O)>sn(L) \\ O, \text{ otherwise}\end{cases} \text{ and } sn(O\mu L)=\begin{cases} sn(L), \text{ if } sn(O)>sn(L) \\ sn(O), \text{ otherwise}\end{cases} \blacksquare$$

Theorem 2. (Order Independence of the Selective Log Replay Operations)

If ρ and μ are defined by the Definition 1, it enables order independent log replay.

Proof. Suppose that $sn(L_1)<sn(L_2)<sn(L_3)$ for log records $L_1$, $L_2$, and $L_3$. Then, $$(O\rho L_1)\rho L_2=L_1\rho L_2=L_2, \text{ and } (O\rho L_2)\rho L_1=L_2\rho L_1=L_2$$

$$\because (O\rho L_1)\rho L_2=(O\rho L_2)\rho L_1$$

$$((O\rho L_1)\rho L_2)\rho L_3=(L_1\rho L_2)\rho L_3=L_2\rho L_3=L_3, \text{ and } ((O\rho L_2)\rho L_3)\rho L_1=L_3$$

$$\because ((O\rho L_1)\rho L_2)\rho L_3=((O\rho L_2)\rho L_3)\rho L_1$$

Therefore, ρ is commutative and associative operator. The same holds for the μ.

By the Theorem 1, ρ and μ enable the order independent log replay. ■

Although this selective log replay can be applied to any kind of physical logging including redo-undo logging or redo-only logging, redo-only logging is preferable in favor of the reduced log volume, comparable to that of the differential logging.

Update Sequence Numbers

There are several choices for the update sequence number. A simple choice is to timestamp log records when the precision of timestamps is enough to distinguish any two updates on the same slot. An obvious alternative is to maintain a single, global sequence number with Algorithm 1 for each update. However, using a single counter incurs a contention on the counter during the parallel logging. Even during the recovery, a single, global hash table has to be built to maintain the update sequence number for the slots that are replayed by the encountered log records. Since each log loader at recovery accesses the global hash table, it incurs the contention.

Algorithm 1. Global Sequence Number (GSN)

1. Acquire the latch for the global counter
2. Increase the counter by 1 and save the current value of it
3. Release the acquired latch
4. Return the saved counter value In order to lessen the contention on the global counter and the global hash table, it is possible to partition the database and maintains a counter for each partition. Since each partition has the space for its own counter, the global hash table need not be built during the recovery. The size of a partition can be chosen arbitrarily from the entire database to a slot. As the size of a partition decreases, the contention will be lessened but the space overhead for the local counters will grow. Thus, the choice will be guided by a tradeoff between space needed for the local counters and the contention incurred by global counter.

Optimization 1. When a counter covers a smaller portion of the database than a transaction lock does, access to the counters does not require any latching.

For example, since transactional locking is generally performed at the slot or higher level, maintaining a counter for each slot allows a transaction to access the counters without any latching as in Algorithm 2. Note that only one transaction can update a slot at a given moment, and the same for a counter.

Algorithm 2. Slot Sequence Number (SSN)

1. Increase the counter for the given slot by 1
2. Return the current value of the counter Even with the global sequence number, there is room for reducing the lock contention, especially when a transaction involves a number of updates. If the log records of a transaction are stored consecutively on disk and the transaction generates only a log record for the slot updated multiple times, assignment of the global sequence number can be deferred until the commit time as shown in Algorithm 3.

Algorithm 3. Transaction Sequence Number (TSN)

1. If this is the first call by the given transaction, invoke Algorithm 1 and save the return value
2. Return the saved counter value According to these two optimization rules, slot sequence number (SSN) and the transaction sequence number (TSN) are used. It is also assumed that the slot-level locking and the so-called private log buffering, which guarantees that the log records of a transaction are stored consecutively on disk and the transaction generates only a log record for the slot updated multiple times.

Handling Limitation of Selective Log Replay

Figure 3:
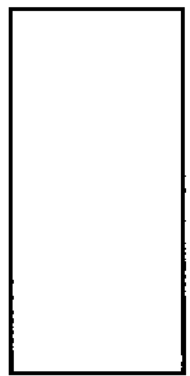
FIG. 3 is an illustration where the portions of a database covered by two log records overlapping each other.

There may be a situation where two log records cover either the same portion of the database or non-overlapping portions of the database. FIG. 3 shows such a situation where situation shown in FIG. 3, where the portions of database covered by the log records L1 and L2 overlap each other. Suppose that L1 is encountered after L2 has been replayed. Then, L1 is discarded because it has a smaller update sequence number than L2, and this may result in the loss of information recorded in the shaded area of L1.

Such a situation does not occur when logging is done at the page level, because the size of a page is fixed in most of database systems. However, it may occur when the lot-level logging assumed. A page is formatted with a desirable slot size when it is popped out of the free page list. Thus, the slot size in a page can vary with time, and this leads to the situation shown in FIG. 3. This situation should be handled carefully, especially when storing an update sequence number within a slot. If the slot size at the time of log record creation is different from the slot size at the time of replay, it is impossible to compare the update sequence number of a log record to that of a slot.

To address the above situation, another sequence number named PVN(page version number) may be introduced. Residing in the header of each page, the PVN is increased by one when a page is formatted with a different slot size. When creating a log record, the PVN value of the corresponding page is copied to the log record. During recovery, a log record with a smaller PVN value than the corresponding page is discarded.

Another limitation of selective replay is that timestamps need to be reset in order to avoid their overflow. Resetting timestamps should be performed in an action-consistent state, followed by action-consistent checkpointing. Fortunately, the action-consistent checkpointing is needed rarely although it interferes with user transactions C. Parallel Redo Only (PROL) Implementation Private Log Buffering A preferred embodiment of the present invention uses parallel redo only logging ("PROL") that combines redo-only logging followed by selective reply. To implement PROL, a private log buffering method is used. The private log buffering method maintains the redo and undo log records of active transactions in their own private memory space constituting one or more private buffers. When a transaction commits, only the redo records are flushed together with a commit log record. The undo records of a transaction are used for aborting the transaction, but they are not written to disk. In this way, only the redo records need to be written to the disk.

Such private log buffering method has the following advantages over the contrasted public log buffering, which writes both redo and undo records to a public log buffer once they are generated. Note that the private log buffering also needs a public log buffer, but it is accessed only when the transaction commits.

- When a transaction aborts, there is no need to write its log records on the disk except when a checkpointing is performed. But, in the public log buffering, since the aborted transaction's log record may be already stored on the log disk, the so-called compensation logging is needed to reduce the amount of undo operations during the post-crash recovery.
- If a transaction involves a number of updates, the private log buffering method reduces the contention on the public log buffer.
- Since the log records of different transactions are intermixed on the disk in the public log buffering, it is not easy to collect the log records of a loser transaction. But, since the private log buffering method stores the log records of a transaction consecutively on the disk in the private log buffering, only the tail in the log file may be inspected.

The private log buffering method requires more memory space than the public log buffering method. To reduce such memory overhead under in-place update scheme, PROL does not maintain after images of the redo log record in the private log buffer when an update takes place. Instead, the after images are collected and directed to the public log buffer when the transaction commits. For an active transaction, the modified private log buffering in PROL requires the space for only the undo log records and some information needed for gathering the after images. Another advantage of this modification is to require only a log record when a transaction updates the same slot multiple times.

The modified private log buffering is applied to even to the differential logging. Since a differential log record is used for both redo and undo operations, only the differential log records can be maintained in the private log buffer.

Log Record and Page Structure

Figure 4A:
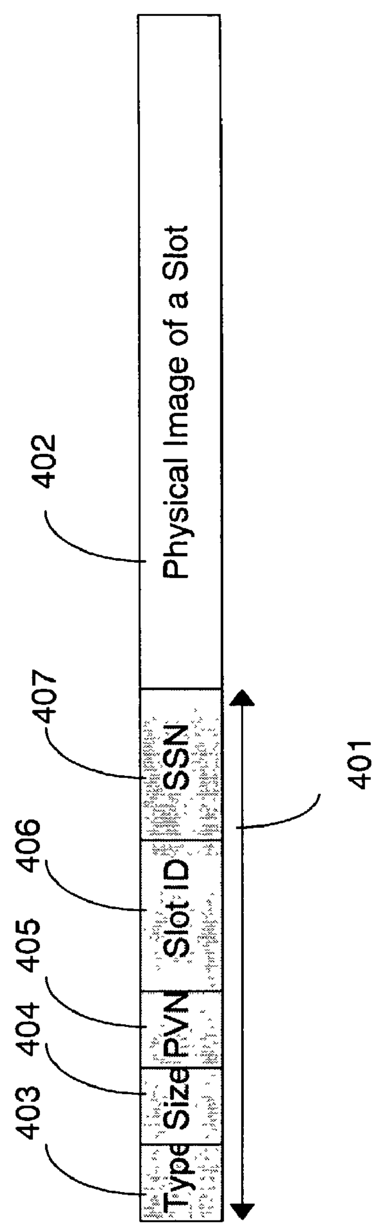
FIG. 4A is the structure of an update log record structure in a preferred embodiment using SSN-based PROL.

FIG. 4A shows the structure of an update log record structure in a preferred embodiment using SSN-based PROL. There may be five types of log records in SSN-based PROL: update, begin_transaction, commit_transaction, begin_checkpoint, and end_checkpoint. Among these, the abort_transaction type is not needed for SSN-based PROL because the log records of the aborted transactions on disk are not written.

The update log record consists of a log header 401 and the physical image of a slot 402. The log header 401 further consists of a slot sequence number (SSN) 407, a slot ID 406 representing the address of the slot to which the log record will be applied, a size 404 represents the size of the slot, a type 403 specifying the type of log records, and a page version number (PVN) specifying a page version.

Differently from this structure of the update record, the log records for begin_transaction and commit_transaction will have just two fields: the type and transaction ID (TID) fields. In the page header, the dirty flag indicates whether this page needs to be checkpointed or not. The bitmap field represents whether each slot is free or not.

Figure 4B:
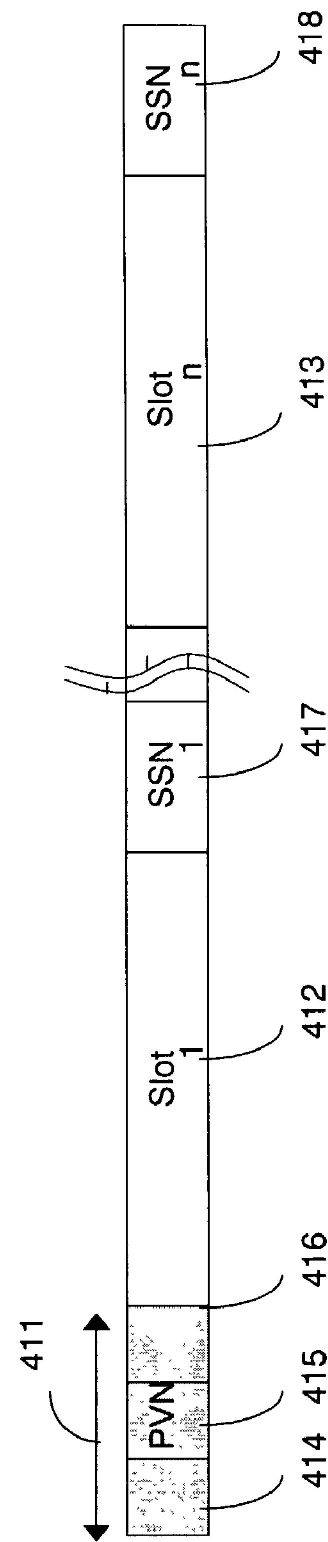
FIG. 4B is the organization of a page stored in main memory in SSN-based PROL.

FIG. 4B shows the organization of a page stored in main memory in SSN-based PROL. It consists of a page header 411 and multiple slots such as 412 and 413. Each page header stores a dirty flag 414, a page version number (PVN) 415, and a bit map 416 for recording the state of each slot in the page. The state is set to "occupied" if data is inserted to the corresponding slot or "free" if data is erased from the slot. Stored together with each slot is an update sequence number most recently played such as 417 or 418.

TSN-based PROL uses a slightly different log record structure and page organization from those of the SSN-based PROL. The SSN field is unnecessary in the update log record. Instead, the TSN value obtained at the commit time is attached to the begin_transaction record. In the page header, no such update sequence number field as SSN is needed.

Parallel Logging and Checkpointing

Figure 5:
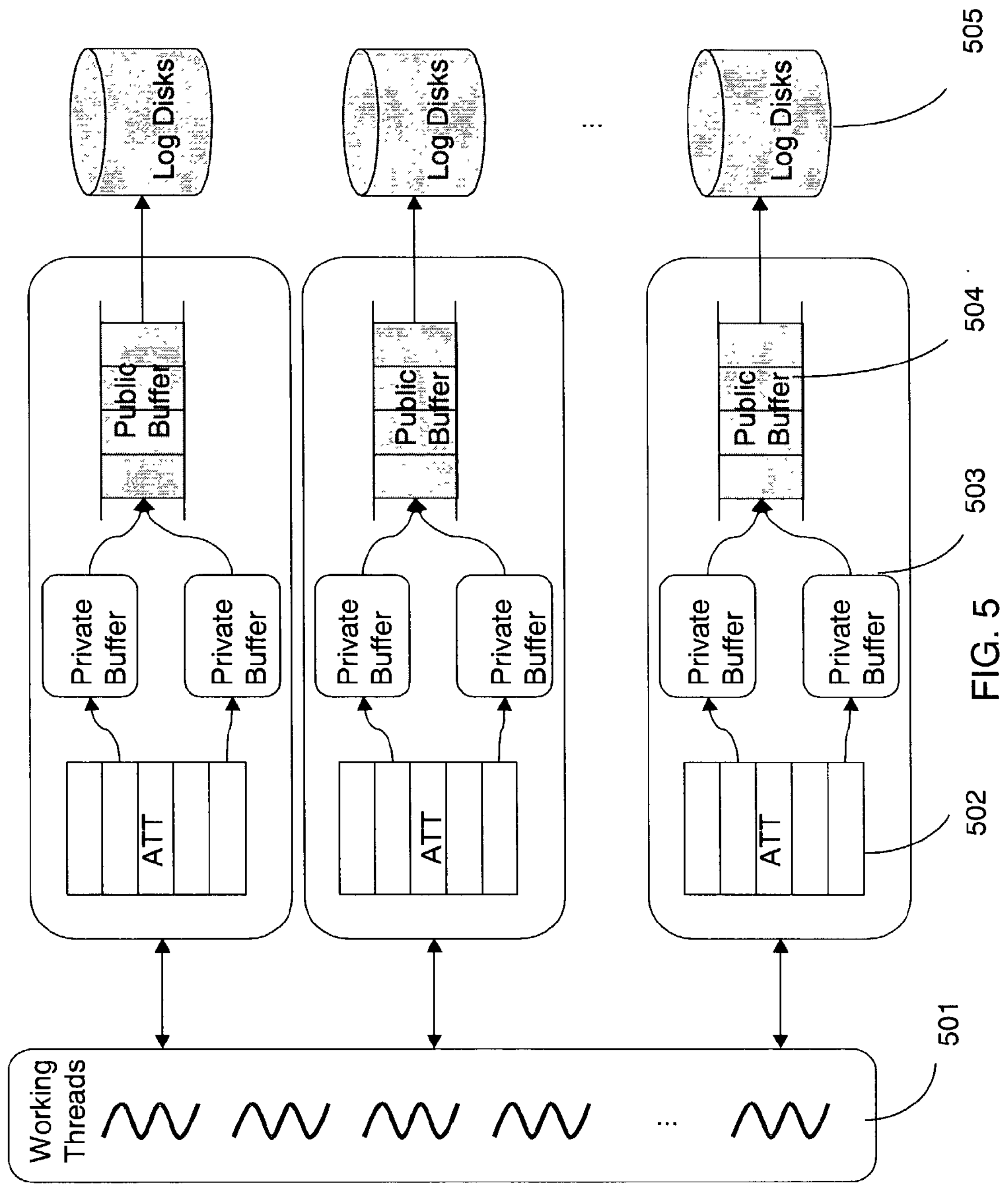
FIG. 5 is a block diagram of the logging system architecture of the present invention using SSN-based PROL.

FIG. 5 shows the logging system architecture of the present invention using SSN-based PROL. The commutativity and associativity of the redo operations in PROL of the present invention enable unrestricted distribution of the log records to multiple log disks. To reduce the contention on the shared data structures, active transaction tables (ATT) such as 502 for storing the list of active transactions, private log buffers such as 503 for storing both redo and undo transactions, and the public log buffers such as 504 for storing committed redo transactions are partitioned by the log disks.

ATT such as 502 is used to find the transactions that are reflected to the backup database, but are aborted later. This table is initialized from the active transaction list. Such list is stored in the log anchor just before the recent checkpointing completes. When reading a commit record, the corresponding entry in the ATT is removed, if exists. After the roll forward completes, the remaining transactions in the ATT are the transactions that should be undone.

The SSN-based PROL maintains a local counter on each slot. Alternatively, the TSN-based PROL maintains a global counter for counting transactions. Note that since the slot-level transactional locking is assumed, maintaining SSN does not incur any additional contention.

Algorithms 4, 5, and 6 are the update, transaction commit, and transaction abort algorithms in the SSN-based PROL. The generation of redo log records is deferred until the transaction commit time. The log buffering thread and the log flushing thread are separated from each other so that the log buffering thread committing a transaction may not remain idle until its log records are flushed. If there are any log records to flush in the public log buffer, the log flushing thread flushes them and finishes the remaining commit processing for the transactions included in the flushed log.

Algorithm 4. Update

1. Generate the redo log record and undo log record in the private log buffer.
2. Update the slot.
3. Copy SSN of the slot and PVN of the page into the redo log record, and increment SSN.

Algorithm 5. Transaction Commit

1. Generate the redo records by combining the headers and after images, and append them together with a transaction commit record.
2. Flush the private log buffer to the corresponding public log buffer.
3. Wait until the redo log records are written to the disk.
4. Release all the locks that the transaction holds.
5. Notify the user that the transaction has been committed.
6. Remove the matching element from the ATT.
7. Delete the private log buffer for the transaction.

Algorithm 6. Transaction Abort

1. Apply the undo log records to the primary database.
2. Release all the locks that the transaction holds.
3. Notify the user that the transaction has been aborted.
4. Remove the matching element from the ATT in a latched state.
5. Delete the private log buffer for the transaction.

PROL can be used with parallel checkpointing, as shown in Algorithm 7. Each checkpointing thread flushes dirty pages located in its own checkpointing partition. To allow the execution of the user transactions during checkpointing, it is required to write undo log records of the ATT and active transaction list at that moment just before the transaction completes. And also, such undo logging is done for each transaction/log partition in parallel. It is assumed that such undo log records are stored on the same disk with the redo log file, but separately.

Algorithm 7. Parallel Checkpointing

1. Create a begin_checkpoint record and append it to all the public log buffers.
2. Choose the backup database that was the least recently checkpointed as the current backup database.
3. For each checkpointing partition in parallel,
   A. While scanning the database page by page, copy all the dirty pages into the current backup database asynchronously.
   B. Wait until all the asynchronous I/Os are completed.
4. For each transaction/log partition in parallel,
   A. Hold a latch on the ATT.
   B. Write the undo log of all the active transactions on the assigned disk.
   C. Write the active transaction list on the assigned disk.
   D. Release the latch.
5. Append an end_checkpoint record into all the public log buffers and update log anchor with the current backup database ID and begin checkpointing the positions of the log records.

Parallel Restart

PROL of the present invention supports the fully parallel restart by allowing multiple log disks to proceed simultaneously with loading backup disk partitions. Algorithm 8 presents the steps for processing the individual log disk. Similarly, Algorithm 9 presents the steps for loading a backup disk partition.

In the case of TSN-based PROL, a global hash table is maintained to bookkeep the TSN value of each replayed slot. All slot ID and TSN pairs should be included in the hash table. But, the loaded backup slots may be excluded, because some of them will not be updated by log records and the remaining will be replayed by the log record with the same slot image.

Algorithm 8. Log Processing in Restart

1. Read the position of begin_checkpoint record from the log anchor and mark it as the begin of the log.
2. Initialize ATT from the active transaction list stored in the log anchor.
3. Go backward in the log from the end until the first commit record is encountered.

Mark the position as the end of the log.

4. From the marked log begin to the marked log end, go forward in the log, doing the following:
   A. For an update log record,
      (i) Hold a latch on the page.
      (ii) If the update record's PVN is larger than or equal to the page header's PVN, proceed to the following step. Otherwise, release the latch and ignore this record.
      (iii) If the update record's SSN is larger than the slot's SSN, redo and update the slot's SSN with the record's SSN. Otherwise, ignore the current update record.
      (iv) Release the latch.
   B. For a commit log record,
      (i) Remove the corresponding TID in the ATT, if it exists.
5. Wait until the backup loading completes.
6. Roll back the remaining TIDs in the ATT.

Algorithm 9. Backup Loading

1. Find the recently checkpointed backup DB copy from the log anchor information.
2. Read the pages of this backup DB into the backup DB buffer.
3. For each page read in the backup DB buffer, do:

A. Hold a latch on the page.

B. If the buffered page's PVN is equal to or larger than the primary page header's PVN, proceed to the following step. Otherwise, release the latch and skip this page.

C. For each slot s in the page, do:
   (i) If the slot SSN of s is larger than the SSN of the corresponding slot t in the primary database, override the image and SSN of t with the after image and SSN of t, respectively.
   (ii) Otherwise, ignore the current update record.

D. Release the latch.

PROL-Based Hot Standby System Architecture

Figure 6:
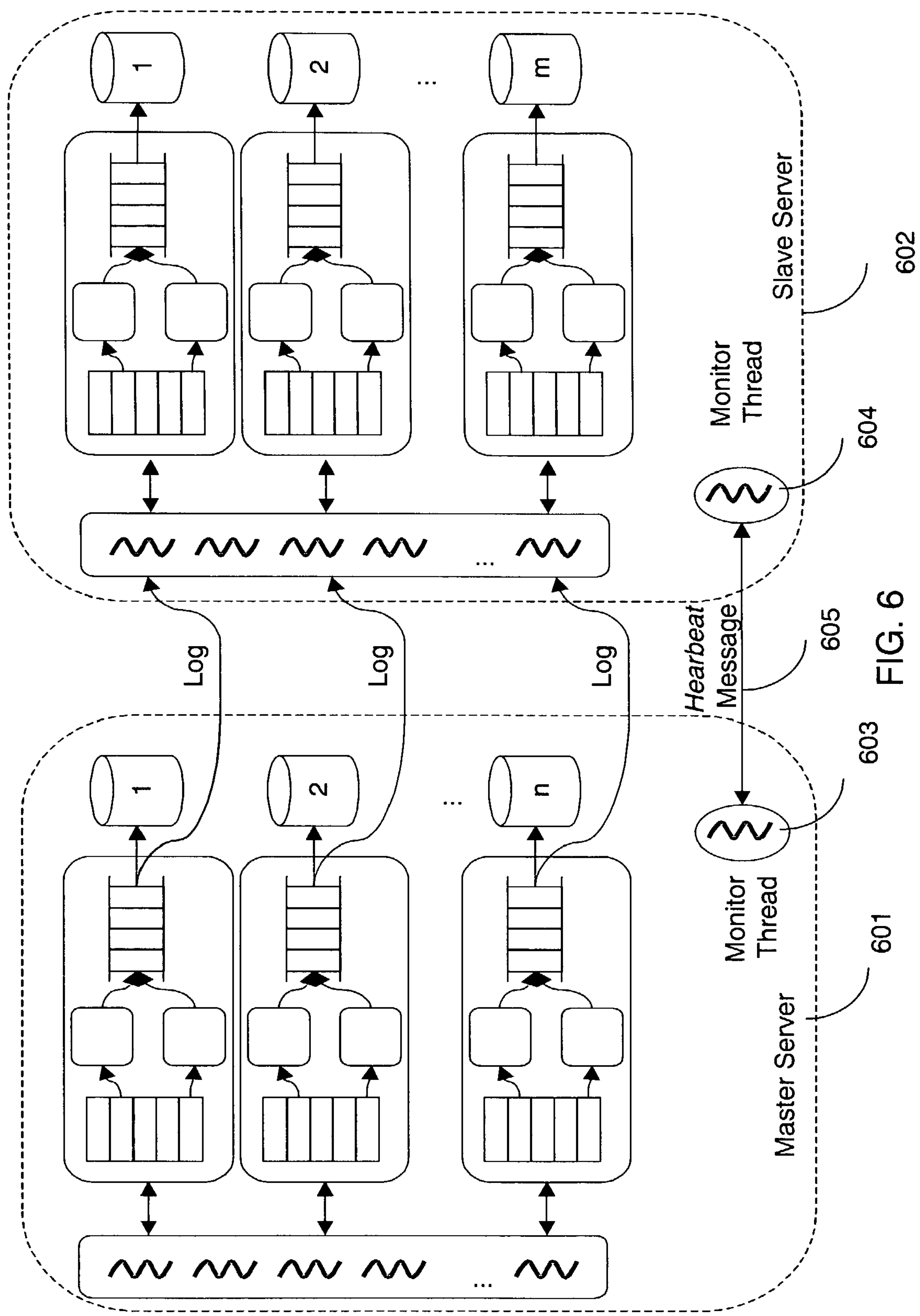
FIG. 6 is a block diagram of the PROL-based hot standby system architecture of the present invention.

FIG. 6 shows the PROL-based hot standby system architecture of the present invention. This hot standby architecture also exploits the parallelism in log-based synchronization. Multiple log streams are established between a master server 601 and a slave server 602. Since PROL enables order-independent log replay, there is no need to merge the multiple log streams in the slave server. Instead, the slave server can replay them in parallel. Only the log records of committed transactions are propagated to the slave server.

Following the 1-safe log synchronization, the master server 601 propagates the log pages that are safely stored on the disk. The slave server 602 replays the log records in the received pages and returns the acknowledgement message to the master server. The monitor threads 603 and 604 send and receive a heartbeat message 605 periodically. If no heartbeat message arrives from the master server for a given period, the slave server 602 automatically takes over.

To deal with the inconsistency between two participating servers incurred by the 1-safe scheme, the synchronization process is done as described in Algorithms 13 and 14. The lost transactions' log records are retransmitted to the taken-over server, and the log records arrived to the taken-over server are replayed selectively. If the slot to which the lost transaction's log record is applied has been updated after taking over, the log record is ignored. As the result, the images of two servers are converged to a consistent and up-to-date state.

The simplified hot standby algorithms are described in Algorithms 10 to 14 as follows.

Algorithm 10. Takeover of the Slave Server

1. Wait until all the received log records are replayed.
2. Abort the active transactions at the moment.
3. Set the sync_position as the recently received log record ID.
4. Set the send_position as the tail address of the log file.
5. Resume the transaction service.

Algorithm 11. Normal Processing of the Master Server

Iterate the following:

A. If the connection with the slave server is available,
   (ii) Send a log page located from the send_position to the slave server, if it is reflected to the log disk.
   (ii) Receive an acknowledgement message from the slave server, and increment the send_position by the size of the successfully sent log page.

(B) Otherwise,
   (i) Wait until it is recovered.
   (ii) If the recovered slave server requires the synchronization process, invoke Algorithm 14.

Algorithm 12. Normal Processing of the Slave Server

Iterate the following:

(A) If the connection with the master server is available,
   (i) Receive a log page from the master server, and replay log records in the page.
   (ii) If the received log record is safely stored in the log disk, send the acknowledgement message to the master sever.

(B) Otherwise,
   (i) If the heartbeat message does not arrive for a period, invoke Algorithm 10.

Algorithm 13. Restart of the Failed Master Server

1. Do the following synchronization process for lost transactions:
   (i) Require the synchronization processing by asking the sync_position to the taken-over server.
   (ii) Collect the transactions that are committed in the log located from the sync_position.
   (iii) Send all the log records generated by the collected transactions to the taken-over server.
2. Invoke Algorithm 12.

Algorithm 14. Synchronization Process of the Taken-over Server

1. Send the sync_position to the failed master server.
2. For each received log record of the lost transactions, do:
   (i) If the timestamp of the log record is larger than that of the corresponding slot, replay it with transactional locking.
   (ii) Otherwise, ignore the log record.

D. Experimental Results

To compare the logging and recovery performance of PROL of the present invention with those of the differential logging scheme (DL) and the non-parallelized redo-only logging (ROL) scheme, a series of experiments were conducted. As previously mentioned, private log buffering is combined with PROL and ROL. For a fair comparison with PROL, differential logging was implemented with private log buffering (DL-private) as well as one with public log buffering (DL-public). Two variants of PROL were implemented: PROL with a slot sequence number (PROL-SSN) and PROL with a transaction sequence number (PROL-TSN).

A test database was used which models a simplified SMS(short message service) message table with three fields. The size of a record or a slot was 256 bytes. The primary database included 2.5 million records, and thus the size of the primary database was 620~639 MB. Since PROL-SSN maintains the SSN for each slot, it consumes a little more space than other schemes. For the 2.5 million record database, this SSN overhead is around 19 MB.

There are two types of transactions: one inserts two records into the message table, and another deletes two records from the table. Table 1 shows the log overhead incurred by each scheme for each of these transactions: transaction begin/commit records, and the update log header. PROL-SSN and DL-public have the biggest overhead because PROL-SSN requires the update sequence number field for each update log record, and DL-public requires the previous LSN field for each update log record, where the previous LSN field is used for rolling back loser transactions without scanning all the unrelated log records. On the other hand, ROL and DL-private show the smallest overhead. Since PROL-TSN attaches an update sequence number only to a transaction begin record, its log record overhead is slightly higher than ROL or DL-private.

The experiment was conducted on a shared-memory multiprocessor PC server with four 700 MHz Xeon CPUs, 8 GB RAM, and dozen SCSI disks. The average seek time of each disk was 5.2 msec, average rotational latency was 4.17 msec, and the internal transfer rate was 20~30 MB/sec. The server had an Adaptec 160 SCSI card, which supports up to 160 MB/sec. For a hot standby experiment, two PC servers were connected with a gigabit Ethernet switch. In each PC server, the SCSI card and a gigabit Ethernet card are linked via a 64 bit/66 Mhz PCI bus.

Logging Performance

The logging throughput was measured by varying the number of log disks, the abort ratio, and the size of a slot when the system is overloaded. The size of a group in the public log buffer was fixed at 128 KB.

Figure 7:
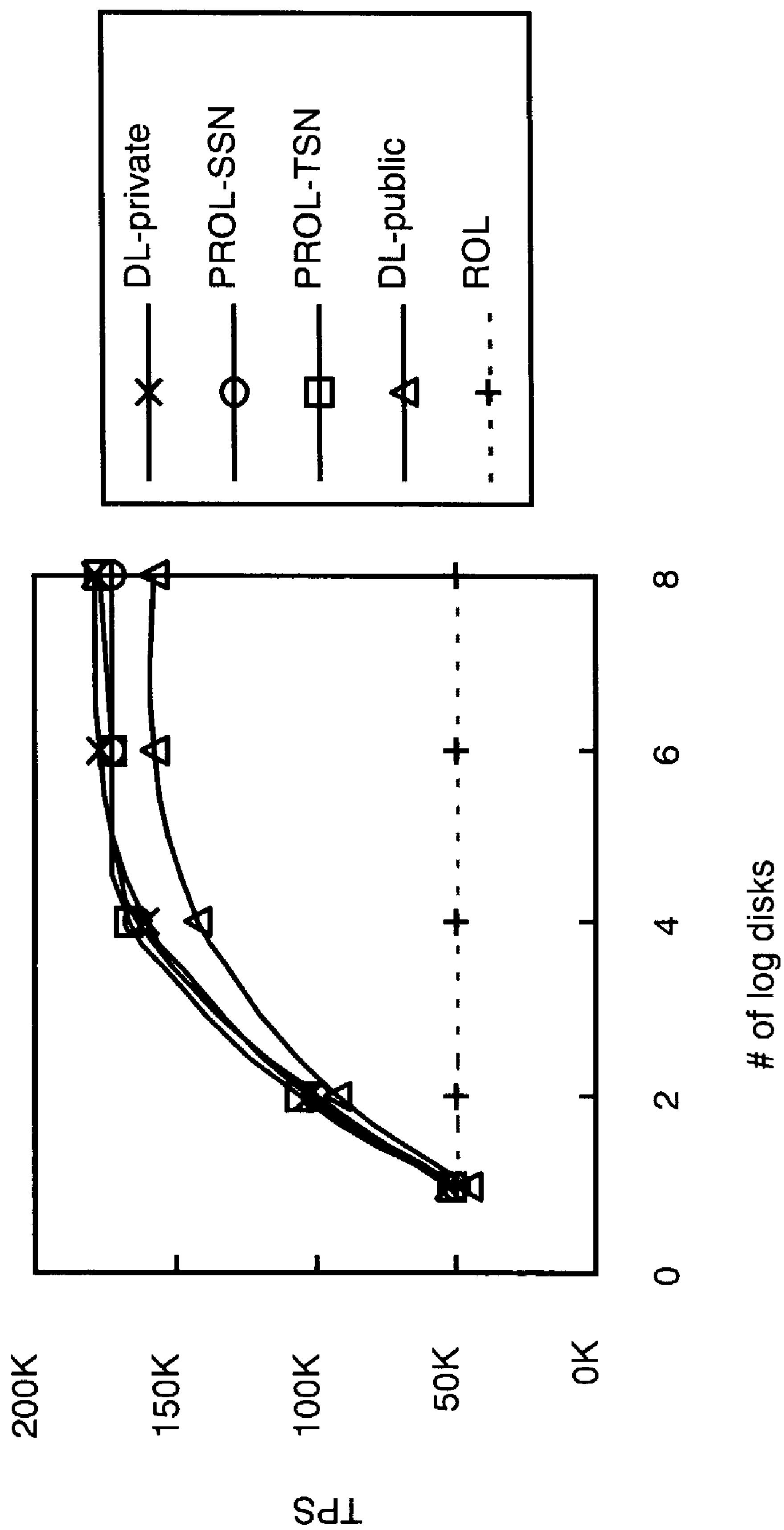
FIG. 7 is a graph of the logging throughput with varying number of log disks.

FIG. 7 shows the logging throughput in TPS (transactions per second) with the number of log disks. The transaction abort ratio was 5%. The observation is summarized as follows.

TABLE 1

The Log Overhead for a Transaction with Two Updates

| Logging Scheme | PROL-SSN | PROL-TSN | DL-private | DL-public | ROL |
|---|---|---|---|---|---|
| Log Overhead | 64 B | 56 B | 48 B | 64 B | 48 B |

The throughput of parallelized logging schemes increased almost linearly with the number of disks until it becomes saturated, while the non-parallelized scheme, ROL was not scalable. The best parallelized schemes outperformed ROL by about 3.5 times.

PROL-TSN, PROL-SSN, and DL-private showed almost the same throughput. The throughput of DL-public was a little lower than that of these schemes because of the contention on the public log buffer. Since a transaction generated a pair of begin/commit transaction records and two update records in this experiment, the DL-public accessed the public log buffer four times as many as other schemes with the private buffering.

The throughput of the parallelized schemes became saturated when the number of log disks was more than 4. The SCSI channel becomes saturated when the disks were fully used for logging.

Figures 8A, 8B:
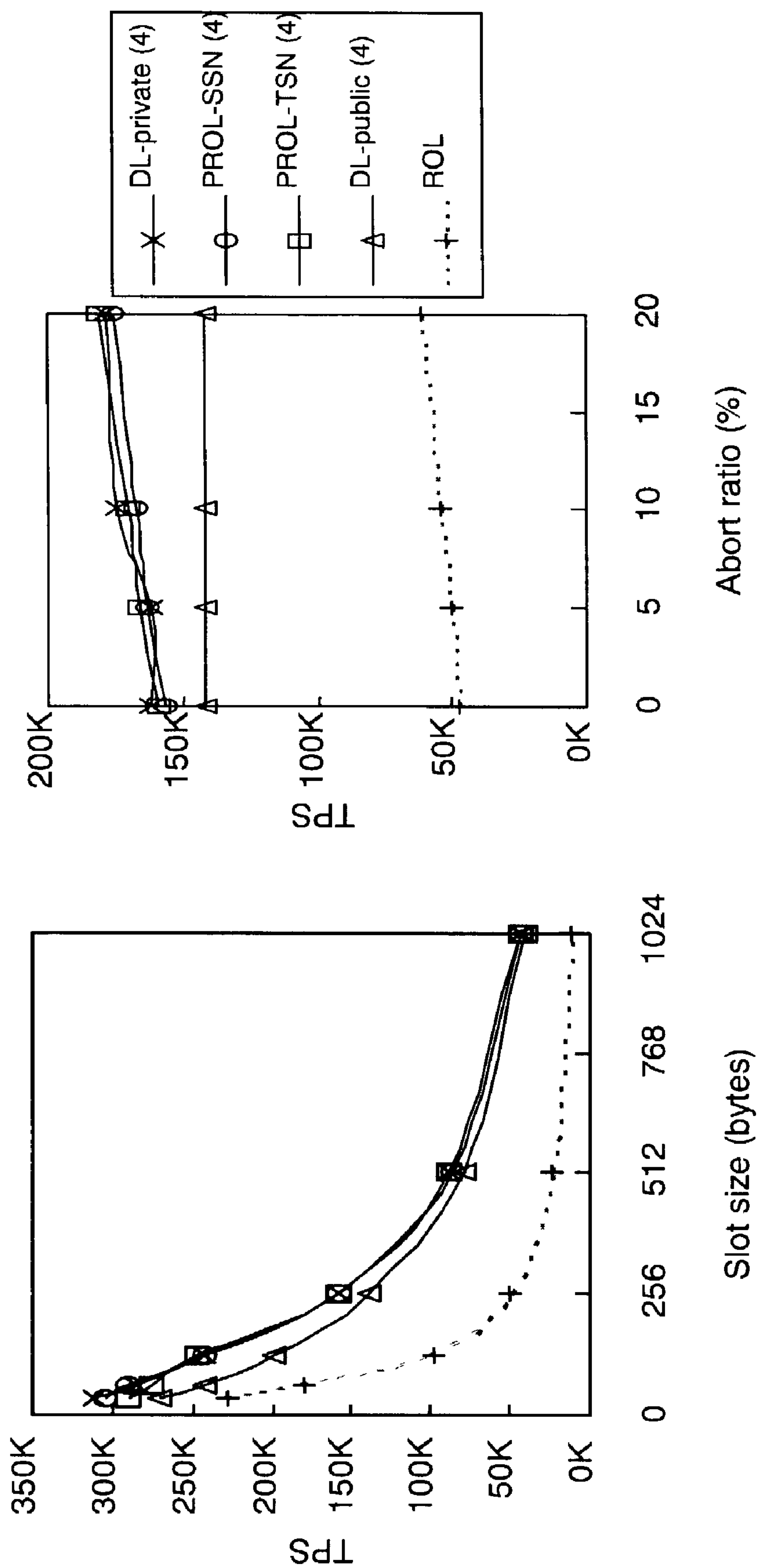
FIG. 8A is a graph of the logging throughput with varying slot sizes.
FIG. 8B is a graph of the logging throughput in a 4-way multiprocessor platform during logging with the abort ratio varying from 0% to 20%.

FIG. 8A shows the logging throughput with the varying slot size. It is noted as the throughput goes down as the slot size increases, the performance of DL-public converged to that of other parallelized schemes with the private buffering because of the reduced contention on the public log buffer.

FIG. 8B shows the logging throughput with the abort ratio varying from 0% to 20% in a 4-way multiprocessor platform. Since the private log buffering does not write any log records to the disk for the aborted transactions, the required log disk I/O will slightly decrease with the increasing abort ratio while the aborted transactions contribute to the throughput. DL-public(4) shows no change with the varying abort ratio because it writes log records for the aborted transactions according to the compensation logging scheme. As the result, when the abort ratio is 20%, DL-private(4), PROL-SSN(4), and PROL-TSN(4) outperform DL-public (4) by 1.26 times, and ROL by 2.95 times.

To see the effect of the log-based synchronization on the run-time throughput, the PROL-SSN-based log shipping scheme was implemented.

Figure 9:
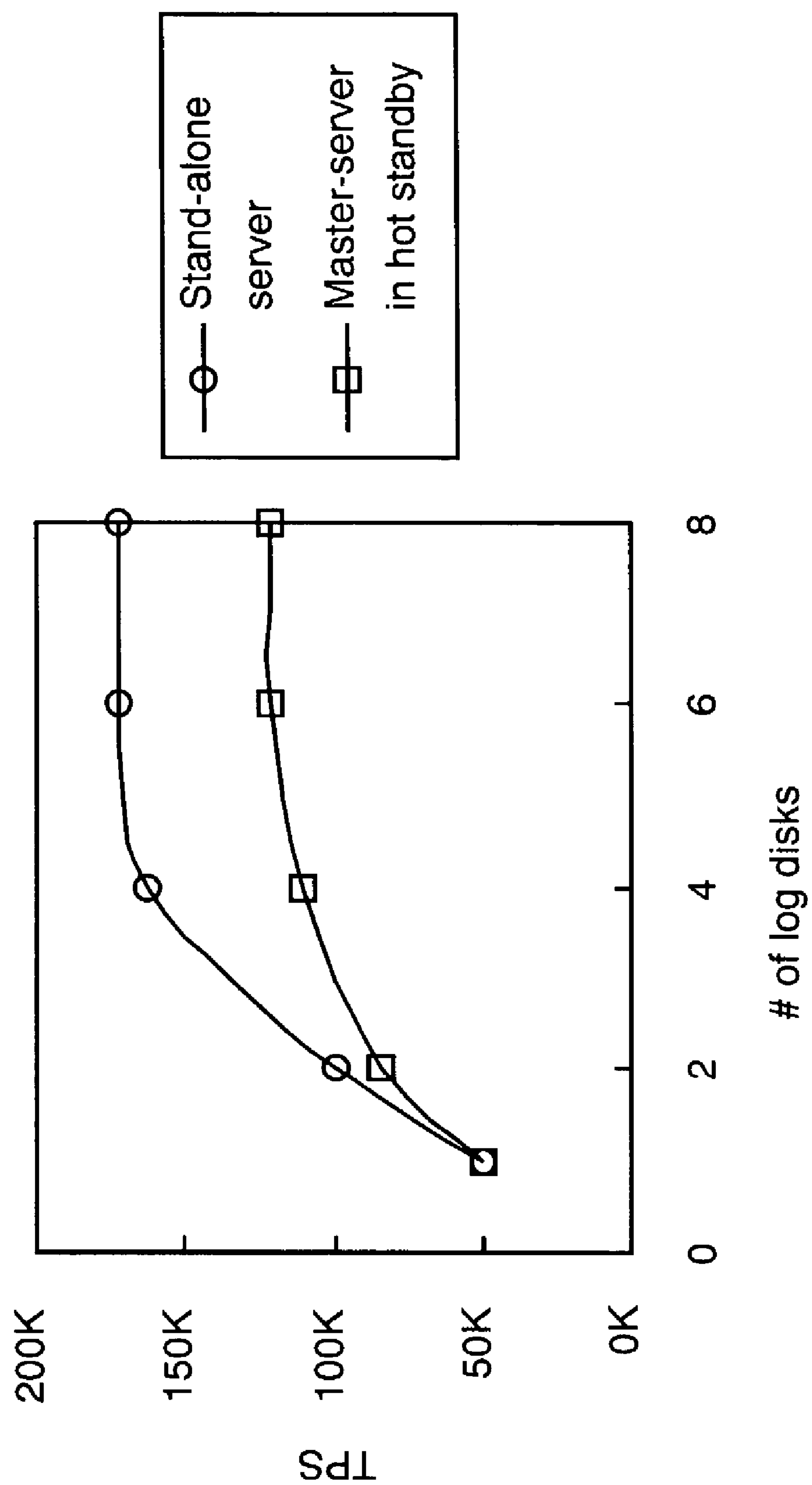
FIG. 9 is a graph comparing the logging throughput of the stand-alone server with that of the master server that ships SSN-based PROL log records to the slave server.

FIG. 9 compares the logging throughput of the stand-alone server with that of the master server that ships PROL-SSN log records to the slave server. As the number of log disks increases, the throughput of the master server decreases to about 70% of the stand-alone server throughput. Such performance gap is due to the following two reasons.

During the log propagation to the network, the log in DRAM is transferred to both the SCSI card and the Ethernet card via PCI bus. Therefore, the logging throughput is limited by the bandwidth of the PCI bus as well as that of the SCSI channel.

When the log shipping speed is as fast as the log flushing speed, there is no need to access the log disk for the log propagation because the log buffer can hold them until it is exploded. If this is not the case, the sequential access to the log disks for log writing may be disturbed by the log shipping threads. Therefore, it is expected that the performance gap becomes larger if the log propagation rate to the network is not so high.

Recovery Performance

To gauge the practical impact of parallel recovery, the restart time during recovery was also measured. The restart time is broken down to the backup DB loading time and the log processing time.

Figure 10:
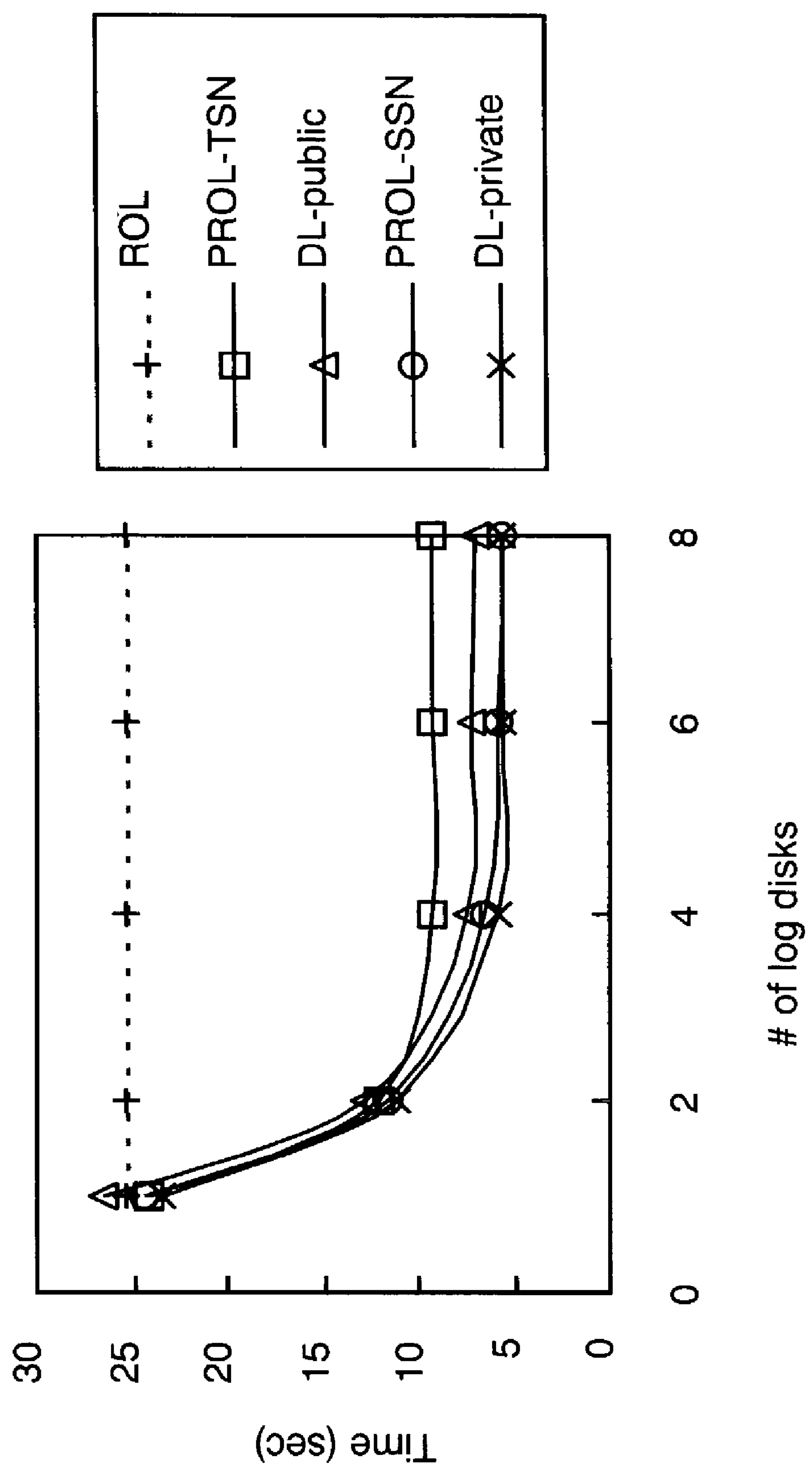
FIG. 10 is a graph of the log processing time in seconds with varying number of log disks.

FIG. 10 shows the log processing time in seconds with the number of log disks. 1.2 M transactions were replayed during the log processing. The log volume was 739 MB for PROL-SSN or DL-public, 650 MB for PROL-TSN, and 640 MB for DL-private or ROL.

The log processing time of the parallelized schemes decreased with the number of log disks, while the non-parallelized, ROL did not.

The log processing time of PROL-TSN was saturated when the number of disks was more than 2. The restart hash table for TSN incurred more contention with the increasing number of disks.

The log processing time of DL-public was longer than that of PROL-SSN or DL-private. This is because the

- log volume of DL-public was slight larger than the other two schemes due to the compensation logging for aborted transactions. For this experiment, the 5% abort ratio was assumed.
- The log processing time of DL-public, DL-private, and PROL-SSN became saturated when the number of log disks approached to six, when the SCSI channel became saturated.
- Two best schemes, DL-private and PROL-SSN, outperformed ROL by 4.5 times in the experimental environment.

Figures 11A, 11B:
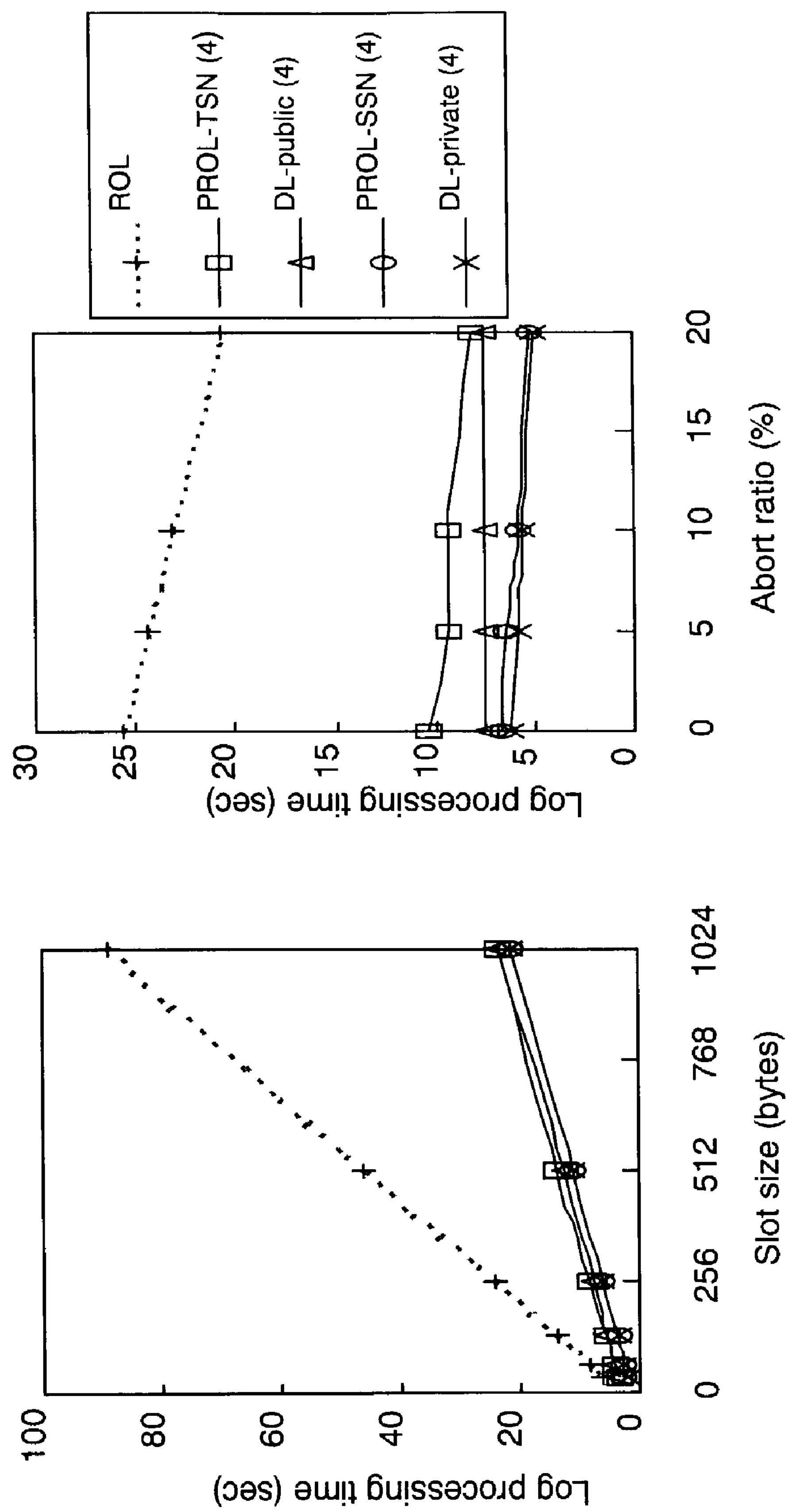
FIG. 11A is a graph of the log processing time with varying slot sizes in a 4-way multiprocessor platform.
FIG. 11B is a graph of the log processing time when 1.2 M transactions are replayed in a 4-way multiprocessor platform.

FIG. 11A shows the log processing time with varying slot sizes in a 4-way multiprocessor platform. The log volume overhead by the update sequence number was negligible regardless of the slot size. The log processing time was measured with varying the abort ratio from 0% to 20%.

FIG. 11B shows the result when 1.2 M transactions are replayed in a 4-way multiprocessor platform. While the log volume of the private log buffering schemes decreased with the abort ratio, that of the public log buffering did not. Such difference in the log volume was reflected in the result. Note that PROL-SSN(4) and DL-private(4) outperform DL-public(4) by 1.44 times, ROL by 3.97 times.

In evaluating the overall recovery time, two types of measurement were conducted. The first one with the postfix seq measured the time for the parallel log processing separately from the time for the parallel backup database loading. The other one with the postfix para measured the recovery time when the log processing was intermixed with the backup loading.

Figure 12A:
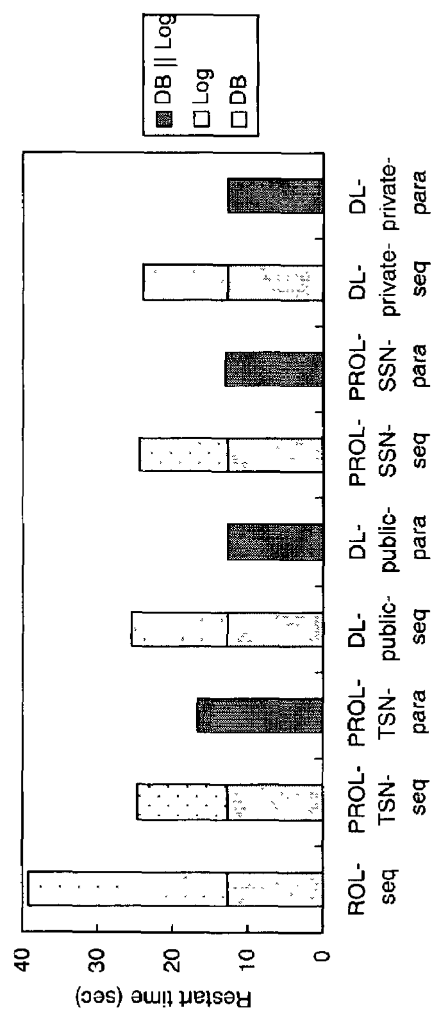
FIG. 12A is a graph of the measured restart time with two log disks and two backup disks.
Figure 12B:
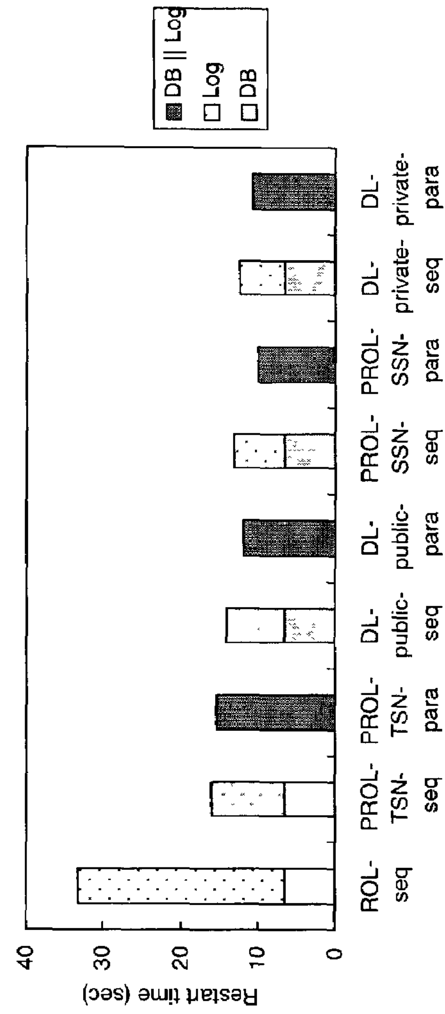
FIG. 12B is a graph of the measured restart time with four log disks and four backup disks.

FIG. 12A and FIG. 12B show the result when the log volume size was almost the same with the primary database size, namely 620~639 MB. FIG. 12A show the measured restart time with two log disks and two backup disks, and FIG. 12B shows the measured restart time with four log disks and four backup disks. The following observations are made.

- Intermixing the backup database loading and the log processing reduced the total recovery times of DL-public, DL-private, and PROL-SSN almost to half as shown in FIG. 12A.
- The total recovery time of PROL-TSN-para was longer than DL-public-para, DL-private-para, or PROL-SSN-para in both FIG. 12A and FIG. 12B. In PROL-TSN-para, since each backup loading process also accessed the restart hash table on TSN, the contention in the hash table increased.
- FIG. 12B shows that the gain in the restart time by intermixing the backup loading and the log processing was not so high as in FIG. 12A. The SCSI channel became saturated when the eight disks are fully involved in the restart.
- In FIG. 12B, the difference between DL-public-para and DL-private-para came from the difference in the log volume. Since the abort ratio was fixed at 5%, the log volume of DL-public was larger than that of DL-private by 5%.
- The marginal difference between PROL-SSN-para and DL-private-para came from the selective log replay of PROL. Since the backup database loading for the slot with already replayed log was skipped, the number of memory write operations was slightly smaller than that of DL variants.
- PROL-SSN-para outperformed ROL-seq by 2.83 times when two backup disks and two log disks were involved, and by 3.13 times when four backup disks and four log disks were involved.

In summary, the experimental results on a 4-way multiprocessor platform show that PROL-SSN and DL-private are almost indistinguishable in terms of the logging and recovery performance While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A method of logging and recovery in a transaction-processing system having a main memory for storing a database, the method comprising:

partitioning a database into slots;

generating log records, each representing updates to the database by storing a physical image of an update database portion;

assigning an update sequence number representing a sequence of database updates to each log record for each slot and to the updated database portion, the assigning includes an allocated slot sequence number (SSN) representing a sequence of slot updates as the update sequence number, and the assigning includes an assigned a page version number (PVN) that is incremented when a page is formatted with a different slot size;

storing the generated log records into one or more log disks; and recovering from a system failure by replaying the generated log records read from said one or more log disks in a sequence independent from the order of log generation, wherein replaying includes selectively applying the physical image in the read log record to a corresponding slot of the database based on the slot sequence number assigned to the corresponding slot.

2. The method of claim 1, wherein the storing includes checkpointing by storing a backup copy of the database into the one or more backup disks.

3. The method of claim 1, wherein the storing includes having the database reside in main memory.

4. The method of claim 1, wherein the assigning the update sequence number includes an assigning global sequence number (GSN) stored in a global counter representing the sequence of updates to the entire database.

5. The method of claim 4, wherein the allocating includes:

acquiring a latch for the global counter;

increasing the counter by 1 and saving its current value;

releasing the acquired latch; and returning the saved counter value.

6. The method of claim 1, wherein the assigning the update sequence number includes assigning a transaction sequence number (I'SN) representing the Sequence of transactions performed by the system.

7. The method of claim 1, wherein the recovering includes, before the replaying, ignoring the read log record if the PVN assigned to the read log record is smaller than the PVN assigned to a corresponding page of the database.

8. A method of logging and recovery in a transaction-processing system having a primary database in main memory for transaction processing so that the system can recover the database in case of a system failure, wherein the system maintains an active transaction table (ATT) for storing active transactions, private log buffers for storing redo and unto transactions, and public log buffers for storing committed redo transactions, the method comprising:

partitioning the database into slots;

generating log records, each representing updates to the database by storing physical image of the update portion;

assigning an update sequence number representing a sequence of database updates to each log record for each slot and to the updated portion of the database, the assigning including allocating a slot sequence number (SSN) representing a sequence of slot updates as the update sequence number;

assigning a page version number (PVN) that is increased by one when a page is formatted with a different slot size;

storing the generated log records into one or more log disks; and recovering from a system failure by replaying the generated log records read from said one or more log disks in a sequence independent from the order of log generation, wherein replaying includes selectively applying the physical image in the read log record to a corresponding slot of the database based on the slot sequence number assigned to the read log record being larger than the slot sequence number assigned to the corresponding slot;

wherein the generating includes:

generating a redo log record and undo log records in a private log buffer; updating a respective slot; and copying the update sequence number of the respective slot and the PVN of the page into the redo log record and incrementing the update sequence number.

9. The method of claim 8, wherein generating log records includes:

generating the redo log record during a transaction by combining headers and after images, and appending them together with a transaction commit record;

flushing the private log buffer to a corresponding public log buffer;

waiting until the redo log records are written to the disk;

releasing locks that the transaction holds;

notifying the user involved in the transaction that the transaction has been committed;

removing the matching element from the ATT; and deleting the private log buffer for the transaction.

10. The method of claim 8, wherein generating log records includes:

applying the undo log record to the primary database;

releasing all the locks that the transaction holds;

notifying the user that the transaction has been aborted;

removing the matching element from the ATT in a latched state; and deleting the private buffer for the transaction.

11. The method of claim 8, wherein assigning includes allocating the update sequence number as a global sequence number representing the sequence of updates to the entire database.

12. The method of claim 8, wherein assigning includes allocating the update sequence number as a transaction sequence number representing the sequence of transactions performed by the system.

13. The method claim 8, wherein the storing includes:

creating a begin checkpoint record and appending it to all the public log buffers;

choosing the backup database that was the least recently checkpointed as the current backup database;

for each checkpointing partition in parallel, while scanning the database page by page, copying all dirty pages into the current backup database asynchronously, and waiting until all asynchronous I/Os are completed;

for each transaction/log partition in parallel, holding a latch on the ATT, writing the undo logs of all the active transactions on the assigned disk, and writing the active transaction list on the assigned disk, and releasing the latch; and appending an end checkpoint record into all the public log buffers and update log anchors with the current back up database ID and begin checkpointing the positions of log records.

14. A method of recovering a database in a transaction-processing system from a system failure, wherein the system generates log records representing updates to the database, comprising:

assigning a slot sequence number (SSN) representing a sequence of slot updates as the update sequence number and allocating a page version number (PVN) that is incremented when a page is formatted with a different slot size;

reading log records, each having an update sequence number representing the sequence of database updates and a physical image of the updated portion;

reading the updated database portion having an updated sequence number representing the sequence of updates to the database portion; and recovering from a system failure by replaying the generated log records read from said one or more log disks in a sequence independent from the order of log generation, wherein replaying includes selectively applying the physical image in the read log record to a corresponding slot of the database based on the slot sequence number assigned to the read log record being larger than the slot sequence number assigned to the corresponding slot.

15. The method of claim 14, reading the updated database includes reading a backup copy of the database stored in one or more backup disks by checkpointing before the reading log records.

16. The method of claim 14, wherein reading the updated database includes reading the database that resides in main memory.

17. The method of claim 14, wherein the recovering includes applying redo and undo operations using public log buffering.

18. The method of claim 14, wherein the recovering includes applying redo operations only using private buffering.

19. The method of claim 14, wherein the assigning includes allocating the update sequence number as a global sequence number representing the sequence of updates to the entire database.

20. The method of claim 14, wherein the assigning includes allocating the update sequence number as a transaction sequence number representing the sequence of transactions performed by the system.

21. The method of claim 14, wherein the recovering includes:

replaying a log record if the update sequence number in the log record is larger than the most recently played sequence number.

22. The method of claim 14, wherein the recovering includes, before the replaying, ignoring the read log record if the PVN assigned to the read log record is smaller than the PVN assigned to a corresponding page of the database.

23. A method of recovering a database in a transaction-processing system from a system failure, wherein the system generates log records representing updates to the database and wherein the system maintains an active transaction table (ATT) for storing active transactions, private log buffers for storing redo and unto transactions, and public log buffers for storing committed redo transactions, the method comprising:

reading the log records, each having an update sequence number representing the sequence of database updates and a physical image of the updated portion, wherein reading the log records includes reading a slot sequence number (SSN) representing a sequence of updates to a given slot of the database as the update sequence number;

reading page version numbers (PVN) each of which is incremented when a page is formatted with a different slot size;

reading the updated database portion having an updated sequence number representing the sequence of updates to the database portion; and recovering from a system failure by replaying the generated log records read from said one or more log disks in a sequence independent from the order of log generation, wherein replaying includes selectively applying the physical image in the read log record to a corresponding slot of the database based on the slot sequence number assigned to the read log record being larger than the slot sequence number assigned to the corresponding slot.

24. The method of claim 23, wherein reading log records includes reading the update sequence number as a global sequence number representing the sequence of updates to the entire database.

25. The method of claim 23, wherein reading log records includes reading the update sequence number as a transaction sequence number representing the sequence of transactions performed by the system.

26. The method of claim 23, wherein recovering includes:

reading the position of a begin checkpoint record from a log anchor and marking it as the beginning of the log record;

initializing the ATT from the active transaction list stored in the log anchor;

going backward in the log record from the end until the first commit record is encountered;

marking the position as the end of the log record;

from the marked log beginning to the marked log end going forward in the log, doing the step further comprising the following steps of:

(A) for an updated log record, (i) holding a latch on the page, (ii) if the update record's PVN is larger than or equal to the page header's PVN, proceeding to the next step, otherwise releasing the latch and ignoring the record;

(iii) if the update record's slot sequence number is larger than the current slot sequence number, updating the current slot sequence number with the record's slot sequence number, otherwise, ignoring the current update record;

(iv) releasing the latch;

(B) for a committed log record, (i) removing the corresponding transaction ID (TID) from the ATT, if it exists;

waiting until the back loading completes; and rolling back the remaining TIDs in the ATT.

27. The method of claim 23, wherein recovering includes:

finding the recently checkpointed backup database copy from the log anchor information;

reading the pages of the backup database into a backup database buffer; and for each page read in the backup database buffer, A. holding a latch on the page;

B. if the buffered page's PVN is equal to or larger than the primary page header's PVN, proceeding to the next step, otherwise releasing the latch and skipping this page;

C. for each slot in the page, (i) if the update record's slot sequence number is larger than the stored slot sequence number of the corresponding slot, override the image and the stored slot sequence number of the corresponding slot with the after image and the slot sequence number of the update record, respectively, (iii) otherwise, ignoring the current update record; and D. releasing the latch.

28. The method of claim 23, wherein the recovering includes, before the replaying, ignoring the read log record if the PVN assigned to the read log record is smaller than the PVN assigned to a corresponding page of the database.

29. A method of hot-standby in a transaction system using a database, the method comprising:

storing log records representing incremental change to the database;

exchanging heartbeat messages between a master server and a slave server, thereby enabling the master server to monitor working conditions of the slave server and the slave server to monitor working conditions of the master server;

assigning an update sequence number representing a sequence of database updates to each log record for each slot and to the updated database portion, the assigning including assigning an assigned slot sequence number (SSN) representing a sequence of slot updates as an update sequence number and allocating a page version number (PVN) that is incremented when a page is formatted with a different slot size;

waiting until all log records received from the master server are replayed upon failure to receive the heartbeat message from the master server for a given period;

aborting all active transactions at the moment;

setting a sync-position as the recently received log record ID;

setting a send_position as the tail address of the log file;

resuming the transaction service;

sending, upon restoration of the master server, the sync-position to the restored master server;

receiving log records of lost transactions from the master server; and synchronizing the slave server with the master server using the received log records, wherein the synchronizing includes replaying each of the received log records in a sequence independent from the order of log generation, wherein the replaying includes selectively applying the physical image in a particular log record to a corresponding slot of the database based on the slot sequence number assigned to the particular log record being larger than the slot sequence number assigned to the corresponding slot.

30. The method of claim 29, wherein waiting includes normal processing of the slave server, and wherein the normal processing includes:

A. if the connection with the slave server is available, (i) receiving a log page from the master server, and replaying log records in the page;

(ii) if the received log record is safely stored in the log disk, sending the acknowledgement message to the master server;

B. otherwise, (i) if the heartbeat message dose not arrive for a period, invoking said step of taking over the slave server.

31. The method of claim 29, wherein resuming includes restarting of failed master server, wherein restarting includes:

A. doing the following synchronization process for lost transactions:

(i) requiring the synchronizing processing by asking the sync_position to the taken-over server;

(ii) collecting the transactions that were committed in the log located from the sync_position;

(iii) sending all the log records generated by the collected transactions to the taken-over server; and B. invoking said step of normal processing of the slave server.

32. The method of claim 29, further comprising normal processing of the master server, wherein the normal processing includes:

A. if the connection with the slave server is available, (i) sending a log page located from the send_position to the slave server, if is reflected to the log disk;

(ii) receiving an acknowledgement message from the slave server, and incrementing the send_position by the size of successfully sent log page;

B. otherwise, (i) waiting until it is recovered;

(ii) if the recovered slave server requires the synchronization process, invoking said step of synchronization process of the taken-over server.

33. The method of claim 29, wherein the synchronizing includes, before the replaying, ignoring the particular log record if the PVN assigned to the particular log record is smaller than the PVN assigned to a corresponding page of the database.

34. A transaction-processing system having a database for recovering from a system failure, comprising:

main memory to store the database, the database being partitioned in slots; one or more log disks to store log records representing update to the database by storing the physical image of the update;

one or more backup disks to store a copy of the main memory database; and a recovery manager to replay the generated log records read from one or more log storage devices in a sequence independent from the order of log generation, wherein the recovery manager includes a counter to store an update sequence number representing the sequence of database updates, the counter to store a slot sequence number (SSN) representing a sequence of slot updates as the update sequence number and the counter to store a page version number (PVN) that is incremented when a page is formatted with a different slot size;

wherein the recovery manager selectively applies the physical image in a particular log record to a corresponding slot of the database based on the slot sequence number assigned to the particular log record being larger than the slot sequence number assigned to the corresponding slot.

35. The system of claim 34, wherein the recovery manager is to process transactions where a transaction is a set of operations forming a logical unit in an application.

36. The system of claim 34, wherein the database includes a plurality of fixed-size pages.

37. The system of claim 34, wherein the update sequence number is a global sequence number representing the sequence of updates to the entire database.

38. The system of claim 34, wherein the update sequence number is a transaction sequence number representing the sequence of transactions created.

39. The system of claim 34, wherein the recovery manager includes one or more buffers to store log records before storing them to said one or more disks.

40. The system of claim 39, wherein the one or more buffers include one or more private buffers to store both redo and undo transaction log records.

41. The system of claim 39, wherein the one or more buffers include one or more public log buffers for storing committed redo transaction log records.

42. The system of claim 34, wherein the recovery manager comprises:

a backup loader to load the backup data from said one or more backup disks into the main memory database; and a log loader to load the log from said one or more log disks into the main memory database in order to restore the main memory database to the most recent consistent state.

43. The system of claim 42, wherein the log loader comprises:

a log reader to read the log records from said one or more log disks; and a log player to play the log records to restore the main memory database to the latest consistent state.

44. The system of claim 34, wherein the recovery manager, before applying the physical image, ignores the log record if the PVN assigned to the log record is smaller than the PVN assigned to a corresponding page of the database.

45. A hot-standby system for a system having a database in main memory where one server takes over another in case of a problem, comprising:

a master server to log updates to the database, comprising:

an active transaction table (ATT) for storing a list of active transactions;

a private buffer to store redo and undo transaction log records; and a public log buffer to store committed redo transactions log records to be written to one or more disks; and a slave server to log updates to the database in case of a failure of the master server, comprising:

an aborted transaction table to store the a list of active transactions; a private buffer to store both redo and undo transactions log records; and a public log buffer to store committed redo transaction log records to be written to said one or more log disk;

wherein the master server and the slave server to stores a slot sequence number (SSN) representing a sequence of slot updates as the update sequence number and the master server and the slave server to store a page version number (PVN) that is incremented when a page is formatted with a different slot size; and wherein the slaver server takes over the master server upon its failure, wherein the taking over includes replaying each of the log records received from the failed master server, wherein the replaying includes selectively applying the physical image in a particular log record to a corresponding slot of the database based on the slot sequence number assigned to the particular log record being larger than the slot sequence number assigned to the corresponding slot.

46. The system of claim 45, wherein the slaver server, before the replaying, ignores the particular log record if the PVN assigned to the particular log record is smaller than the PVN assigned to a corresponding page of the database.

47. A computer-readable storage medium that contains a program for logging and recovery in a transaction-processing system having a central processing unit (CPU) and main memory for storing a database, one or more log disks for storing log records representing updates to the database, and one or more backup storage devices for storing a copy of the main memory database, wherein the program under the control of a CPU performs:

generating log records where each log record contains the physical image of the updated portion of the database;

assigning an update sequence number representing the sequence of updates to each log record and to the updated database partition, the assigning including allocating a slot sequence number (SSN) representing a sequence of slot updates as the update sequence number and allocating a page version number (PVN) that is incremented when a page is formatted with a different slot size; and recovering from a system failure by the replaying the generated log records read from said one or more log disks in a sequence independent from the order of log generation, wherein replaying includes selectively applying the physical image in the read log record to a corresponding slot of the database based on the slot sequence number assigned to the read log record being larger than the slot sequence number assigned to the corresponding slot and.

48. The storage medium of claim 47, wherein recovering includes checkpointing by storing the database in one or more backup disks.

49. The storage medium of claim 47, wherein the medium is a CD.

50. The storage medium of claim 47, wherein the medium is a magnetic disk.

51. The storage medium of claim 47, wherein the medium is a magnetic tape.

52. The storage medium of claim 47, wherein the recovering includes, before the replaying, ignoring the log record if the PVN assigned to the log record is smaller than the PVN assigned to a corresponding page of the database.

53. A method of logging and recovery in a transaction-processing system having a main memory for storing a database, one or more disks for storing a copy of the database, and a plurality of log disks for storing log records, the method comprising:

generating log records, each representing updates to the database by storing a physical image of an update database portion;

assigning a slot sequence number representing a sequence of database updates to each of the log records and to a corresponding slot of the database;

storing the generated log records into a plurality of log disks; and recovering from a system failure by replaying each of the generated log records read from each of the one or more log disks in a sequence independent from the order of log generation, wherein the replaying includes selectively applying the physical image in a particular log record to a corresponding slot of the database based on the slot sequence number assigned to the particular log record being larger than the slot sequence number assigned to the corresponding slot.

54. The method of claim 53, wherein the assigning further includes allocating a page version number (PVN) that is incremented when a page is formatted with a different slot size and wherein the recovering includes, before the replaying, ignoring the particular log record if the PVN assigned to the particular log record is smaller than the PVN assigned to a corresponding page of the database.

55. A transaction-processing system having a database for recovering from a system failure, comprising:

main memory to store the database, a plurality of log disks to store log records representing updates to the database by storing the physical image of the update;

one or more backup disks to store a copy of the main memory database; and a a recovery manager to replay the log records read from the plurality of log disks in a sequence independent from the order of log generation;

wherein the recovery manager includes a counter to store a slot sequence number representing the sequence of database updates to a corresponding slot of the database; and wherein the recovery manager selectively applies the physical image in the read log record to a corresponding slot of the database based on the slot sequence number assigned to the read log record being larger than the update slot sequence number assigned to the corresponding slot.

56. The system of claim 55, wherein the recovery manager further includes a counter to store a page version number (PVN) that is incremented when a page is formatted with a different slot size and wherein the recovery manager, before applying the physical image, ignores the particular log record if the PVN assigned to the particular log record is smaller than the PVN assigned to a corresponding page of the database.

* * * * *

UNITED STATES PATENT AND TRADEMARK OFFICE

CERTIFICATE OF CORRECTION

PATENT NO. : 7,305,421 B2
APPLICATION NO. : 10/195822
DATED : December 4, 2007
INVENTOR(S) : Cha et al.

It is certified that error appears in the above-identified patent and that said Letters Patent is hereby corrected as shown below:

In column 1, line 15, delete “System” and insert -- System.” --, therefor.

In column 6, line 54, after “counter” insert -- . --.

In column 6, line 56, after “it” insert -- . --.

In column 6, line 57, after “latch” insert -- . --.

In column 6, line 58, after “value” insert -- . --.

In column 7, line 14, after “1” insert -- . --.

In column 7, line 15, after “counter” insert -- . --.

In column 7, line 26, after “value” insert -- . --.

In column 7, line 27, after “value” insert -- . --.

In column 7, line 48, delete “lot-level” and insert -- slot-level --, therefor.

In column 8, line 4, after “transactions” insert -- . --.

In column 9, lines 39-40, delete “tranactions,” and insert -- transactions, --, therefor.

In column 12, line 37, delete “sever.” and insert -- server. --, therefor.

In column 16, line 4, after “performance” insert -- . --.

In column 16, line 44, in Claim 4, after “includes” delete “an”.

In column 16, line 44, in Claim 4, after “assigning” insert -- a --.

In column 16, line 54, in Claim 6, delete “(I’SN)” and insert -- (TSN) --, therefor.

In column 16, line 66, in Claim 8, delete “unto” and insert -- undo --, therefor.

In column 17, line 61, in Claim 13, after “method” insert -- of --.

In column 17, line 62, in Claim 13, delete “begin checkpoint” and insert -- begin_checkpoint --, therefor.

UNITED STATES PATENT AND TRADEMARK OFFICE

CERTIFICATE OF CORRECTION

PATENT NO. : 7,305,421 B2
APPLICATION NO. : 10/195822
DATED : December 4, 2007
INVENTOR(S) : Cha et al.

It is certified that error appears in the above-identified patent and that said Letters Patent is hereby corrected as shown below:

In column 18, line 8, in Claim 13, delete “end checkpoint” and insert -- end_checkpoint --, theefor.

In column 19, line 4, in Claim 23, delete “unto” and insert -- undo --, therefor.

In column 19, line 39, in Claim 26, delete “begin checkpoint” and insert -- begin_checkpoint --, therefor.

In column 20, line 38, in Claim 29, delete “an assigned” and insert -- a --, therefor.

In column 20, line 47, in Claim 29, delete “sync-position” and insert -- sync_position --, therefor.

In column 20, lines 51-52, in Claim 29, delete “sync-position” and insert -- sync_position --, therefor.

In column 22, line 52, in Claim 45, after “store” delete “the”.

In column 22, line 63, in Claim 45, delete “slaver” and insert -- slave --, therefor.

In column 23, line 27, in Claim 47, after “failure by” delete “the”.

In column 23, line 35, in Claim 47, delete “slot and.” and insert -- slot. --, therefor.

In column 24, line 10, in Claim 53, before “replaying” delete “the”.

UNITED STATES PATENT AND TRADEMARK OFFICE

CERTIFICATE OF CORRECTION

PATENT NO. : 7,305,421 B2
APPLICATION NO. : 10/195822
DATED : December 4, 2007
INVENTOR(S) : Cha et al.

It is certified that error appears in the above-identified patent and that said Letters Patent is hereby corrected as shown below:

In column 24, line 32, in Claim 55, after “and” delete “a”.

In column 24, line 44, in Claim 55, after “than the” delete “update”.

Signed and Sealed this

Nineteenth Day of August, 2008

JON W. DUDAS
*Director of the United States Patent and Trademark Office*